United States Patent
Neumann et al.

Patent Number: 5,080,593
Date of Patent: Jan. 14, 1992

[54] WATER-COOLED HIGH-CURRENT DOCKING PLUG

[75] Inventors: Gerhard Neumann, Waldkraiburg; Paul-Rainer Molitor, Muehldorf, both of Fed. Rep. of Germany

[73] Assignee: Otto Dunkel, GmbH Fabrik fur Elektrotechnische Gerate, Muehldorf, Fed. Rep. of Germany

[21] Appl. No.: 532,580

[22] Filed: Jun. 4, 1990

[30] Foreign Application Priority Data

Jun. 6, 1989 [DE] Fed. Rep. of Germany ....... 3918950

[51] Int. Cl.⁵ .............................................. H01R 39/00
[52] U.S. Cl. ........................................ 439/18; 439/29; 439/843
[58] Field of Search ................... 439/11, 13, 18, 20, 439/21, 28, 29, 821, 830, 837, 839, 842, 857, 863, 864, 668, 669, 889, 843

[56] References Cited

U.S. PATENT DOCUMENTS

| | | |
|---|---|---|
| 2,533,343 | 12/1950 | Bac ........................ 439/857 |
| 2,879,490 | 3/1959 | Campbell et al. ........... 439/29 |
| 3,208,025 | 9/1965 | Hansen ..................... 439/20 |
| 3,972,577 | 8/1976 | Charles et al. ............. 439/21 |
| 4,405,196 | 9/1983 | Fulton ...................... 439/889 |
| 4,507,008 | 3/1985 | Adl et al. .................. 439/863 |
| 4,714,441 | 12/1987 | Corman ..................... 439/842 |

FOREIGN PATENT DOCUMENTS

| | | | |
|---|---|---|---|
| 3605076 | 8/1987 | Fed. Rep. of Germany | 439/668 |
| 0951502 | 8/1982 | U.S.S.R. | 439/842 |

Primary Examiner—Neil Abrams
Assistant Examiner—Hien D. Vu
Attorney, Agent, or Firm—Fleit, Jacobson, Cohn, Price, Holman & Stern

[57] ABSTRACT

A water-cooled, high-current docking plug-connector device designed particularly for automatic welding machines has a plug socket component (1) with elastic contacts (4,6) and a plug pin component (2) for insertion into the socket component (1), so that the components can be rotated relative to each other. In order to transmit high current with low voltages, without the danger of the elastic contacts lifting out of position, several contact ring groups (3) are positioned in axial succession within the plug socket component (1), each of which ring groups (3) has at least one slotted outer socket contact ring (4) with a contact surface (5) resting elastically on the inner surface of the plug socket component (1), and at least one slotted inner socket contact ring (6) with a contact surface (7) which, in the inserted condition, rests elstically on the plug pin component (2). The outer socket contact ring and the inner socket contact ring of each contact ring group have mutually interfitting tapered contact surfaces (8,9).

11 Claims, 3 Drawing Sheets

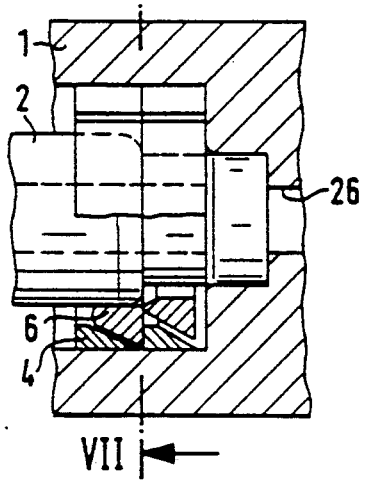
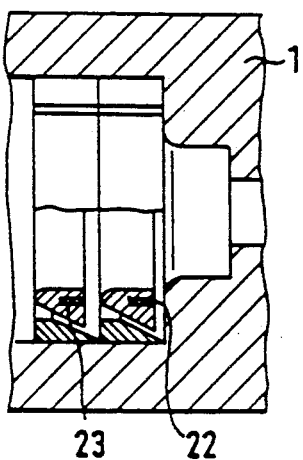
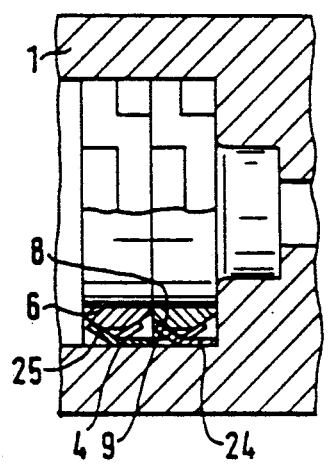
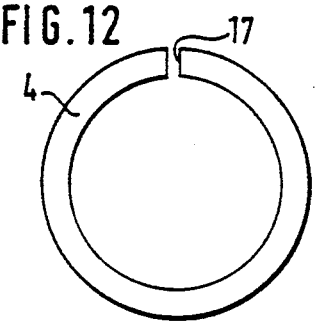
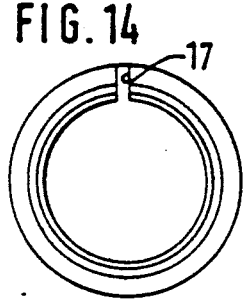
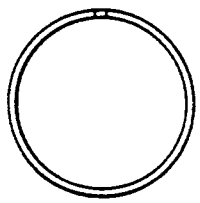
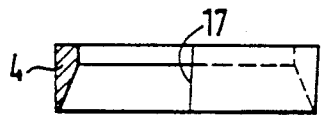
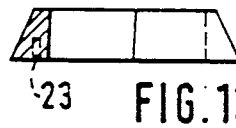
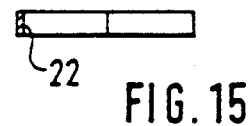
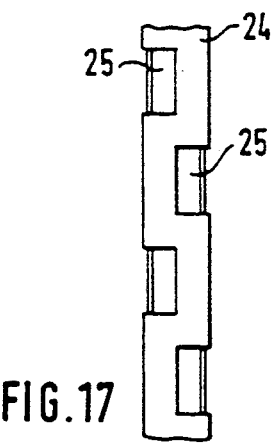

WATER-COOLED HIGH-CURRENT DOCKING PLUG

BACKGROUND OF THE INVENTION

This invention relates to a water-cooled, high-current docking plug-connector device, particularly for automatic welding equipment. The device is of the type having a plug socket component and a plug pin component for engaging with the socket component in a manner whereby the components can be rotated relative to one another, and the device having generally elastic contact elements.

Plug-connector devices of the above type, particularly as they are employed in the automobile industry for car-body construction, should take up little space. They should fulfill the demands of high availability, permit high insertion cycles and a speedy repair capability. To achieve high insertion cycles, the frictional forces of the contact elements arising during insertion and removal should not impose too great a load on the contact surfaces. The insertion and removal forces distributed over the entire pin surface should not, therefore, take on excessive values unless it is possible to reduce the frequency of insertion. Also to be taken into consideration, however, is the fact that given the high current strengths customary in practice during brief turn-on periods, the contact elements are subject to extreme loads at the points of contact with the contact pin, particularly when there are non-uniform contact surfaces and high-frequency current surges in unstably designed contact elements. This may result in excessive heating and failure of the plug-connector device.

For the above reasons, conventional plug-connector devices, even when water-cooled so as to tolerate particularly high loads, are generally unsuited to fulfill all of the indicated requirements. Either the insertion and removal forces distributed over the entire contact pin surface are too high, which affects the permissible frequency of insertion, or the contact elements are too unstable for a heavy load, and tend to lift out of position during current surges, which in turn results in excess heating and thus in the failure of the plug connectors.

Furthermore, conventional plug-connectors in water cooled equipment cannot be placed in operation without the entire current-water connection system being disconnected, which necessitates long downtimes.

For these reasons it is common practice in electrode holder conversion systems (docking devices) to position the welding transformer behind the plug-connector devices, in order to transmit relatively low primary currents through the plug-connector devices in the case of correspondingly high voltages. With this arrangement, however, the welding transformers on robot arms must be moved simultaneously by the robot systems. In addition to the heavy weights involved and the resulting loads on the robots, this solution to the problem is also highly capital-intensive, since each electrode holder must be equipped with a transformer.

SUMMARY OF THE INVENTION

An object of the invention is to provide a plug-connector device of the type described which enables high currents to be transmitted with low voltages and substantially without danger of the elastic contact elements lifting out of position, and in such a way that, in use, a welding transformer can be positioned in front of a plug-connector device without impeded function.

Accordingly, a high-current docking plug-connector device in accordance with the invention is characterized in that several elastic contact ring groups are positioned axially and in succession within the plug socket component, each of which groups contains at least one slotted outer socket contact ring with contact surface resting elastically on the inner surface of the plug socket component, as well as at least one slotted inner socket contact ring with a contact surface that rests elastically against the plug pin component in inserted condition, and in that the outer socket contact ring and the inner socket contact ring of each contact ring group have tapered contact surfaces which are adjusted or fitted with respect to each other. The plurality of contact ring groups, which function for parallel current transmission, allow for the transmission of the high secondary currents necessary for welding. To this end it is also unnecessary to have increased contact forces, which might result in inadmissibly high contact surface loads. The insertion and removal forces, consequently, can be kept at a low level substantially without fear of contacts lifting out of position during current surges.

It is advantageous, for achieving preselected contact forces between the contact rings of each contact ring group, to provide at least one spring element for the contact ring groups positioned in the socket component, which spring element additionally operates on the contact rings of each group in inserted condition by means of the tapered contact surfaces.

For achieving secure mounting of the contact ring groups in simple fashion, it is advantageous to provide the socket component with a socket shoulder of reduced diameter, which limits axial displacement of the contact ring groups.

In the case of water-cooled high-current docking plug-connector devices which are rotated during application, fitted inner contact rings may be provided, which extend to and rest against the tapered plug pin component.

In high-current docking plug-connector devices for extremely frequent insertion, a series of inner contact rings with differing inner diameters may be provided on the plug pin component, the inner diameters in each case being adjusted to the outer diameter of the corresponding steps of the tapered plug pin component. If n steps, and consequently n contact ring groups, are present, then each plug pin component will bear a frictional load of only 1/n of its surface upon insertion or removal. This provides the desired capacity for a high frequency of insertion with relatively simple means.

The contact elements can be installed without dismantling, i.e. without mechanical disconnection of the connector plug from the docking devices and the current and water connections, and they can be installed simply and quickly. In order to further increase the operating life in the case of any wear on the plug device, the installation of inner contact rings with a reduced nominal diameter will easily accommodate the pin component that may be subject to wear.

Also, in the inventive plug-connector device the contact rings can be readily exchanged in use, if circumstances so require.

Further details, advantages, and features of the invention emerge from the following description and claims with reference to the accompanying drawings.

BRIEF DESCRIPTION OF DRAWINGS

FIGS. 6 and 8 are respectively axial cross-sectional views through the same embodiment, shown in different coupling stages;

FIG. 9 is an axial cross-sectional view through another embodiment of the invention;

FIG. 10 is an axial cross-sectional view through still another embodiment of the invention;

FIGS. 11 and 12 are respectively an axial cross-section and a plan view of an outer socket contact ring;

FIGS. 13 and 14 are respectively an axial cross-section and a plan view of an inner socket contact ring;

FIGS. 15 and 16 are respectively an axial cross-section and a plan view of an elastic washer, as shown in FIG. 1 and FIG. 9;

FIGS. 17 and 18 are respectively a plan view and cross-section through a modified socket contact ring as shown in FIG. 5 and FIG. 10; and FIG. 19 is a schematic axial cross-section through an elastic washer, as shown in FIG. 4.

DESCRIPTION OF PREFERRED EMBODIMENTS

Figure 1:
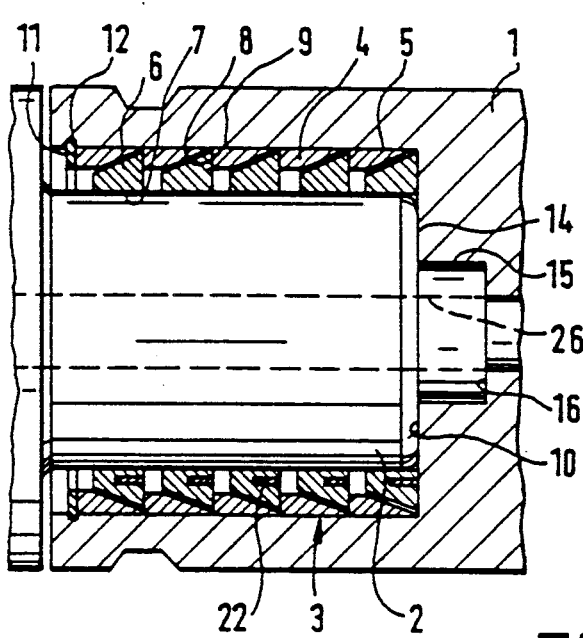
FIG. 1 is an axial cross-sectional view through a plug-connector device having a cylindrical plug pin component.

In each of the illustrated embodiments of the invention, a high-current docking- plug-connector device consists of a socket component 1 and a pin component 2 which engages with the socket component. The design shown in FIG. 1, in which the pin component 2 is cylindrical in shape, is preferred when rotation of the parts relative to one another is required. Several contact ring groups 3 are positioned axially in succession within the plug socket component 1. In the embodiments shown in FIGS. 1 to 3, each contact ring group 3 consists of a slotted outer socket contact ring 4 with a contact surface 5, which rests elastically on the inner surface of the plug socket component 1, and of a slotted inner socket contact ring 6 with a contact surface 7 resting elastically on the plug pin component 2 in inserted condition. In each embodiment the inner socket contact ring 6 and the outer socket contact ring 4 of each contact ring group 3 are provided with complimentary interfitting tapered contact surfaces 8 and 9. Likewise all depicted embodiments have a socket shoulder 10 inside of the socket component 1; the socket shoulder 10 has a reduced diameter and limits the axial displacement of the contact ring groups 3. To give the contact ring groups a secure mounting in the socket component 1, at least one retainer ring 11 is provided which is attached in an annular groove 12 in the socket component 1.

Figure 2:
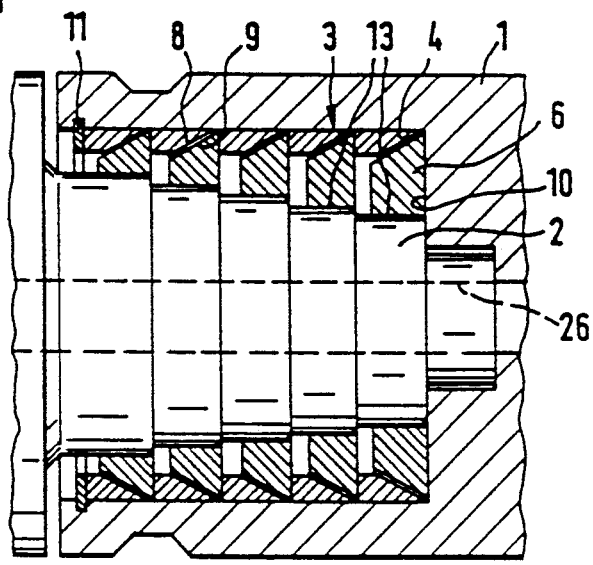
FIG. 2 is an axial cross-sectional view through a plug-connector device of the invention having a plug pin component which is tapered in steps.
Figure 3:
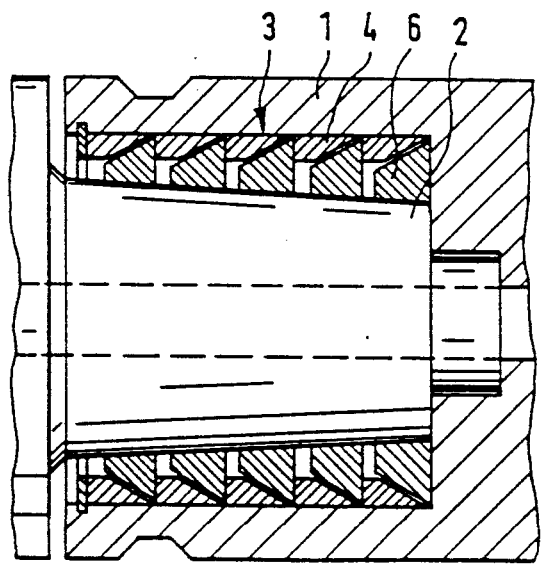
FIG. 3 is an axial cross-sectional view through a plug-connector device having a plug pin component of truncated conical shape.

Diverging from the design shown in FIG. 1—which permits motion of the plug pin component 2 relative to the plug socket component 1 and which employs inner socket contact rings 6 of fitted design which rest against the cylindrically shaped plug pin component 2—the embodiments shown in FIGS. 2, 3, 4, and 5 have non-cylindrical shapes in the area of the plug pin component 2. When high frequencies of insertion are required, the plug-connector device shown in FIG. 2 is suitably provided with a tapered plug pin component which is stepped and for which is provided, contact ring groups 3 with a series of inner socket contact rings 6 of differing diameters. These are in each case fitted to the outer diameter of a corresponding step 13 of the plug pin component 2. In the case of high frequencies of insertion, a plug-connection device can also be employed whose plug pin components have the shape of a truncated cone, as shown in FIG. 3. This arrangement has a series of inner socket contact rings 6 with differing inner diameters, which are fitted to the tapered outer diameter of the pin component.

As can be seen from the drawings, the plug pin component 2 in all embodiments includes a cylindrical guide area 15 which extends beyond the area of contact surface 14. This area marks the installation space for water-free water plug-connectors.

FIGS. 1, 2, and 3 in conjunction with FIGS. 11 and 12 it can be seen that the outer socket contact rings 4 generally comprise a large rotating component with a slot 17 for its elastic positioning on the inner surface of the plug socket component 1.

Figure 6:
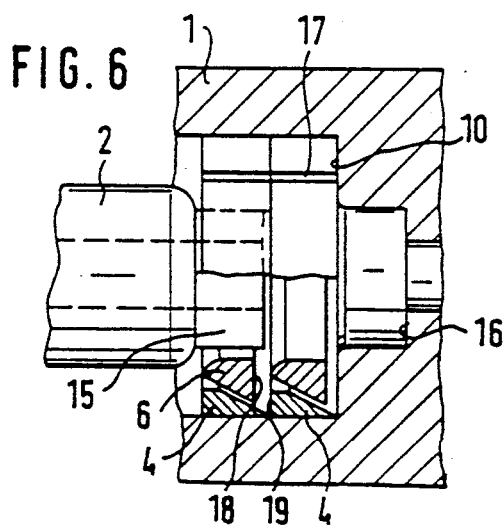
Figure 7:
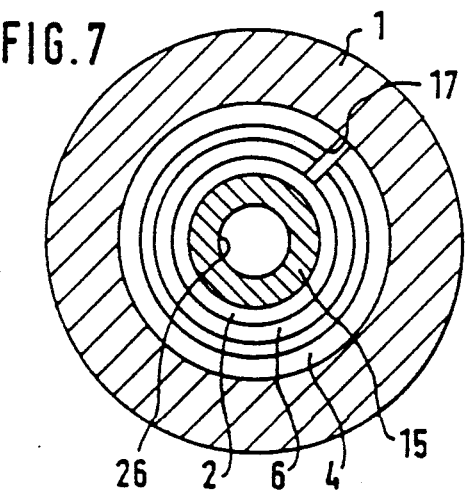
FIG. 7 is a radial sectional view on line VII—VII in FIG. 8.

FIGS. 6 to 8 illustrate the manner in which the plug pin component 2 comes into contact with the plug socket component 1 when the former is inserted into the contact rings 4, 6 of each contact ring group 3. As seen in FIG. 6 the inner socket contact rings 6 initially are somewhat radially inwardly spaced from the outer socket contact rings 4. When the plug pin component 2 is introduced into an inner socket contact ring 6, the latter is moved axially until its outer face 18 rests against the opposing face 19 of the outer socket contact ring 4. The inner ring is then expanded radially until the play, shown in exaggerated form in FIGS. 1, 2, and 3, between the tapered contact surfaces 8 and 9 is substantially eliminated. Current can then flow from the plug pin component 2, over the inner socket contact ring 6 and the face 18 and counter-face 19, to the outer socket contact ring 4, and from there to the plug socket component 1. In the fully inserted state of the pin relative to the socket plug component 1, the number of current conduction areas increases by the number of the contact ring groups 3 which are provided.

Figure 4:
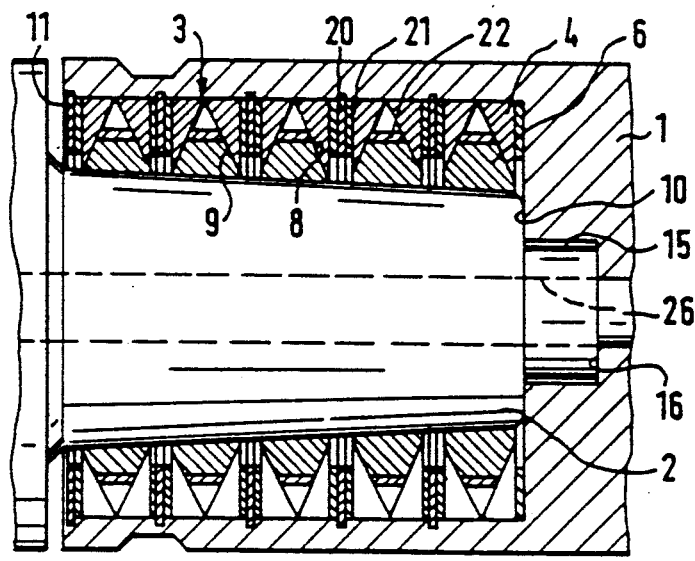
FIG. 4 is an axial cross-sectional view through a modified embodiment of the invention similar to that of FIG. 3.

FIG. 4 shows an embodiment in which each inner socket contact ring 6 fits between a pair of outer socket contact rings 4. Here each contact ring group 3 thus consists of a inner socket contact ring 6 and two outer socket contact rings 4. The individual contact ring groups 3 are positioned within the plug socket component 1 by means of elastic washers 20, which fit into corresponding annular grooves in the plug socket component 1. The contact rings of each contact ring group 3 are held in place by two corrugated elastic rings 21, which rest on the adjacent elastic rings 20 and 11 or on the socket shoulder 10 and are thus positioned against the outer surface of the plug pin component 2 or the inner surface of the plug socket component 1. From FIG. 4 it can be seen that each inner socket contact ring 6 has two tapered contact surfaces 8, against which the corresponding tapered contact surfaces 9 of the outer socket contact rings 4 are adapted to engage.

In order to increase the force with which an inner socket contact ring 6 presses against the outer surface of the plug pin component 2, each inner socket contact ring 6 in the embodiment shown in FIG. 4 is provided with an elastic ring 22 pressing it radially toward the surface of the plug pin component 2. In the embodiment according to FIG. 4 the elastic ring 22 rests on the outer side of the inner socket contact ring 6.

FIG. 9 shows an embodiment in which the inner socket contact ring 6 has a groove 23, parallel to the ring axis and open to one side, to accommodate the elastic ring 22.

Figure 5:
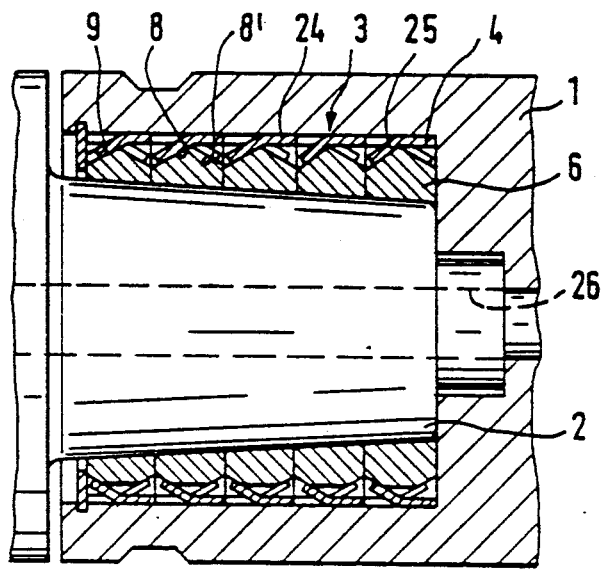
FIG. 5 is an axial cross-sectional view through another modified embodiment of the invention similar to that of FIG. 3.

FIGS. 5 and 10 show a modified design, in which the outer socket contact ring 4 of the contact ring group 3 is, in each case formed from a sheet metal strip 24, as shown in greater detail in FIGS. 17 and 18. The strip 24 has punched out tongues 25 which are directed outward from the strip rim. The tongues 25 form the tapered contact surfaces 9 on which the inner socket contact ring 6 rests elastically with its corresponding tapered contact surface 8. The tongues 25 are each stamped out alternately to opposite sides of the strip rim and are angled outwardly. The inner socket contact ring 6 consequently consists of two tapered contact surfaces 8, 8', on which the angled tongues 25 are elastically supported.

In all the embodiments, both the plug socket component 1 and the plug pin component 2 have a central bore 26, by means of which, when the plug connection is created, cooling water can be conducted for diverting heat arising in the area of the electrode holders, or the like. Sealing may be provided by sealing means known to the art and not therefore shown in the drawing.

We claim:

1. A water-cooled high-current docking plug-connector device, comprising:
    a plug socket component having an inner surface;
    a plug pin component removably insertable into said plug socket component for connecting said components together, said components being relatively rotatable when connected;
    a contact surface on said plug pin;
    a plurality of contact ring groups positioned in axial succession within said plug socket component, each group comprising at least one slotted outer socket contact ring having a contact surface elastically engaging said inner surface of said plug socket component, and at least one slotted inner socket contact ring having a shape to provide a contact surface for engaging elastically said contact surface on said plug pin component when in the inserted position, and mutually engageable tapered contact surfaces on respective outer socket contact and inner socket contact rings of each contact ring group;
    an axially extending groove in one side of said at least one inner socket contact ring; and
    an elastic ring in said groove urging said at least one inner socket contact ring radially inwardly.

2. A water-cooled high-current docking plug-connector device, comprising:
    a plug socket component having an inner surface;
    a plug pin component removably insertable into said plug socket component for connecting said components together, said components being relatively rotatable when connected;
    a frustoconical contact surface on aid plug pin;
    a plurality of contact ring groups positioned in axial succession within said plug socket component, each group comprising at least one slotted outer socket contact ring having a contact surface elastically engaging said inner surface of said plug socket component, and at least one slotted inner socket contact ring having a contact surface for engaging elastically said frustoconical contact surface on said plug pin component when in the inserted position, and mutually engageable tapered contact surfaces on respective outer socket contact and inner socket contact rings of each contact ring group;
    an axially extending groove in one side of said at least one inner socket contact ring; and
    an elastic ring in said groove urging said at least one inner socket contact ring radially inwardly.

3. A water-cooled high-current docking plug-connector device comprising:
    a plug socket component having an inner surface;
    a plug pin component removably insertable into said plug socket component for connecting said components together, said components being relatively rotatable when connected;
    a frustoconical contact surface on said plug pin; and
    a plurality of contact ring groups positioned in axial succession within said plug socket component, each group comprising at least one slotted outer socket contact ring having a contact surface elastically engaging said inner surface of said plug socket component, and at least one slotted inner socket contact ring having a shape to provide a contact surface for engaging elastically said frustoconical contact surface on said plug pin component when in the inserted position, and mutually engageable tapered contact surfaces on respective outer socket contact and inner socket contact rings of each contact ring group;
    said at least one outer socket ring of each contact ring group comprising a strip of sheet metal having a plurality of tongues thereon extending out of the plane of said strip at an angle thereto for engaging a respective tapered surface of a respective inner socket contact ring.

4. A device as claimed in claim 3, wherein:
    adjacent tongues are angled toward opposite sides of said strip; and
    said at least one inner socket contact ring has two oppositely tapered contact surfaces for engaging adjacent tongues respectively.

5. A water-cooled high-current docking plug-connector device, comprising:
    a plug socket component having an inner surface;
    a plug pin component removably insertable into said plug socket component for connecting said components together, said components being relatively rotatable when connected;
    a frustoconical contact surface on said plug pin; and
    a plurality of contact ring groups positioned in axial succession within said plug socket component, each group comprising at least one slotted outer socket contact ring having a contact surface elastically engaging said inner surface of said plug socket component, and at least one slotted inner socket contact ring having a shape to provide a contact surface for engaging elastically said frustoconical contact surface on said plug pin component when in the inserted position, and mutually engageable tapered contact surfaces on respective outer socket contact and inner socket contact rings of each contact ring group;

each contact ring group comprising a slotted inner socket contact ring and two slotted outer socket contact rings at least partly embracing said inner contact ring, and oppositely tapered contact surfaces on said inner contact ring for engaging respective tapered contact surfaces on said outer contact rings.

6. A device as claimed in claim 5, and further comprising:

at least one spring means for each contact ring group adjacent to nd acting axially on each contact ring group for urging said respective tapered contact surfaces into contacting position.

7. A device as claimed in claim 6, wherein:

elastic washers are provided between adjacent contact ring groups; and said spring means comprises two elastic rings interposed between two successive elastic washers.

8. A device as claimed in claim 6, wherein:

said at least one spring means comprises a corrugated elastic ring.

9. A device as claimed in claim 8, wherein:

a plurality of annular grooves are provided in said socket component;

an elastic washer is positioned in each groove; and one of said elastic rings is positioned on each opposite side of each elastic washer.

10. A water-cooled high-current docking plug-connector device, comprising:

a plug socket component having an inner surface;

a plug pin component removably insertable into said plug socket component for connecting said components together, said components being relatively rotatable when connected;

a frustoconical contact surface on said plug pin;

a plurality of contact ring groups positioned in axial succession within said plug socket component, each group comprising at least one slotted outer socket contact ring having a contact surface elastically engaging said inner surface of said plug socket component, and at least one slotted inner socket contact ring having a shape to provide a contact surface for engaging elastically said frustoconical contact surface on said plug pin component when in the inserted position, and mutually engageable tapered contact surfaces on respective outer socket contact and inner socket contact rings of each contact ring group; and an elastic ring acting radially upon said at least one inner socket contact ring for urging said at least one inner socket contact ring radially inwardly.

11. A device as claimed in claim 10, wherein:

said inner socket contact ring has a radially outer side; and said elastic ring engages on said radially outer side.

* * * * *

UNITED STATES PATENT AND TRADEMARK OFFICE
CERTIFICATE OF CORRECTION

PATENT NO. : 5,080,593

DATED : January 14, 1992

INVENTOR(S) : Gerhard Neumann and Paul-Rainer Molitor

It is certified that error appears in the above-identified patent and that said Letters Patent is hereby corrected as shown below:

Title Page:

Under Foreign Application Priority Data please delete "June 6, 1989" and insert -- June 9, 1989 --.

Signed and Sealed this

Fourth Day of January, 1994

Attest:

BRUCE LEHMAN

*Attesting Officer*    *Commissioner of Patents and Trademarks*